United States Patent [19]
Schulhof et al.

[11] Patent Number: 5,841,979
[45] Date of Patent: Nov. 24, 1998

[54] ENHANCED DELIVERY OF AUDIO DATA

[75] Inventors: Nathan Schulhof, Los Gatos; James M. Janky, Los Altos; Grant Jasmin, Sunnyvale, all of Calif.

[73] Assignee: Information Highway Media Corp., Cupertino, Calif.

[21] Appl. No.: 643,963

[22] Filed: May 7, 1996

Related U.S. Application Data

[63] Continuation-in-part of Ser. No. 450,818, May 25, 1995.

[51] Int. Cl.$^6$ ............................ G11B 20/10; H04M 11/00
[52] U.S. Cl. ............................... 395/200.67; 395/200.62; 395/200.36; 395/200.77; 364/400.01; 348/7; 348/6; 348/13; 455/3.2; 455/6.3; 455/3.1; 704/500; 704/503; 711/4
[58] Field of Search ........................ 395/200.67, 200.47, 395/200.49, 200.36, 200.77, 200.61, 200.62; 348/7, 6, 12, 13; 711/1, 4, 102, 103; 455/4.2, 5.1, 6.3, 3.2; 364/400.01; 704/500–504

[56] References Cited

U.S. PATENT DOCUMENTS

| | | |
|---|---|---|
| 4,455,651 | 6/1984 | Baran . |
| 4,567,512 | 1/1986 | Abraham . |
| 4,590,516 | 5/1986 | Abraham . |
| 4,734,764 | 3/1988 | Pocock et al. . |
| 4,761,684 | 8/1988 | Clark et al. . |
| 4,829,372 | 5/1989 | McCalley et al. . |
| 4,890,320 | 12/1989 | Monslow et al. . |
| 4,905,094 | 2/1990 | Pocock et al. . |
| 4,995,078 | 2/1991 | Monslow et al. . |
| 5,025,412 | 6/1991 | Dalrymple et al. . |
| 5,089,885 | 2/1992 | Clark . |
| 5,119,188 | 6/1992 | McCalley et al. . |
| 5,132,992 | 7/1992 | Yurt et al. . |
| 5,172,413 | 12/1992 | Bradley et al. . |
| 5,191,410 | 3/1993 | McCalley et al. . |
| 5,208,665 | 5/1993 | McCalley et al. . |
| 5,222,120 | 6/1993 | McLeod et al. . |
| 5,239,540 | 8/1993 | Rovira et al. . |

(List continued on next page.)

OTHER PUBLICATIONS

D. Deloddera et al., "Interactive Video on Demand," I.E.E.E. Communications Magazine, May 1994, pp. 82–88.

J. R. Jones, "Baseband and Passband Transport Systems for Interactive Video Services," I.E.E.E. Communications Magazine, May 1994, pp. 90–101.

J. Careless, "Surfing Among the Stars", Via Satallite, Dec. 1995, pp. 30–31.

*Primary Examiner*—Emanuel Todd Voeltz
*Assistant Examiner*—Tuan Q. Dam
*Attorney, Agent, or Firm*—John Schipper

[57] ABSTRACT

A system for selection by a user and delivery to the user of selected audio data files at a delivery rate of 2–100 times the delivery rate for normal, audibly perceptible playback of an audio data file. The user registers the user's selection of audio material with a central library of data files and a digitized and compressed omnibus file containing the user's selections is prepared and transmitted to the user at a high data transfer rate. The user receives downloads the omnibus file to a removable, high density diskette or PCMCIA card that may hold ten [Mbytes] Megabytes to one [Gbyte] Gigabyte of digitized text or audio data, using a removable hard drive or its equivalent and a universal data interface that recognized and compensates for omnibus files received in any of a plurality of input signal formats. The user carries this diskette or PCMCIA card until the user has an opportunity to decompress and play back the text or audio data files in audibly perceptible form. The central library contains either text files or audio data files in digitized compressed format. An audio data file may include E-mail messages, from which the system strips the routing information for more convenient playback by the user.

52 Claims, 8 Drawing Sheets

U.S. PATENT DOCUMENTS

| | | | | | |
|---|---|---|---|---|---|
| 5,253,275 | 10/1993 | Yurt et al. . | 5,539,658 | 7/1996 | McCullough ............................. 364/329 |
| 5,264,958 | 11/1993 | Johnson . | 5,541,638 | 7/1996 | Story ............................................ 348/7 |
| 5,265,252 | 11/1993 | Rawson et al. . | 5,548,510 | 8/1996 | Ebert et al. . |
| 5,351,276 | 9/1994 | Doll, Jr. et al. ........................... 379/67 | 5,550,863 | 8/1996 | Yurt et al. ................................ 375/240 |
| 5,367,330 | 11/1994 | Haave et al. . | 5,557,541 | 9/1996 | Schulhof et al. ............................ 348/7 |
| 5,371,736 | 12/1994 | Evan . | 5,572,442 | 11/1996 | Schulhof et al. ................... 395/200.49 |
| 5,386,493 | 1/1995 | Degen et al. ........................... 395/2.76 | 5,619,499 | 4/1997 | Nakabayashi . |
| 5,406,558 | 4/1995 | Rovira et al. . | 5,633,891 | 5/1997 | Rebec et al. ............................. 375/219 |
| 5,440,334 | 8/1995 | Walters et al. . | 5,634,015 | 5/1997 | Chang et al. . |
| 5,440,336 | 8/1995 | Buhro et al. ............................... 348/13 | 5,640,444 | 6/1997 | O'Sullivan . |
| 5,485,460 | 1/1996 | Schrier et al. . | 5,644,790 | 7/1997 | Li et al. . |
| | | | 5,663,901 | 9/1997 | Wallace et al. ............................ 365/52 |
| | | | 5,680,551 | 10/1997 | Martino . |

ENHANCED DELIVERY OF AUDIO DATA

FIELD OF THE INVENTION

This application is a continuation in part of a patent application entitled "Portable Information Storage/Playback Apparatus Having A Universal Data Interface," U.S. Ser. No. 08/450,818, filed on 25 May 1995 and assigned to the Assignee of this application. This invention relates to delivery of compressed digital audio data, at rates much faster than the real time rate, for conversion to speech for portable audible reception in recreational or educational activities.

BACKGROUND OF THE INVENTION

Available information that is relevant to operation of a business or of a household increases at an exponential growth rate. A user of such information must become concerned with how to find the time, in an already crowded workday, to absorb the most relevant of such information. A menu of such information can be provided on a subscription basis, for individual selection by each user. One useful medium for delivery and reception of such information is sound, which requires use of the ears and of a portion of the user's brain but does not require simultaneous use of other senses. Previous systems have usually provided this information as a combination of video and audio in which the audio information was often treated as an afterthought.

In U.S. Pat. Nos. 4,567,512 and 4,590,516, issued to Abraham, a subscriber establishes a two-way telephone link with a computer that controls access to a library of educational and other instructional selections. The subscriber chooses his or her selections by entering codes through a touch tone telephone, and the selections are scheduled and played back in real time using a standard transmitter coupled to the computer. The subscriber is also billed for the selections using the computer.

Subscriber choice of video entertainment, using codes entered through a touch tone telephone, scheduling and queueing, and playback through another channel with wider bandwidth is disclosed by Clark et al in U.S. Pat. Nos. 4,761,684 and 5,089,885. A similar approach for selection, scheduling and transmission of combined video still frames and audio material for advertising and educational purposes is disclosed in U.S. Pat. Nos. 4,734,764 and 4,905,094, issued to Pocock et al, where the video and audio material can be transmitted separately and subsequently combined.

In U.S. Pat. Nos. 4,829,372 and 5,208,665, McCalley et al disclose a system in which a steady stream of combined digital video and audio signals are transmitted on a channel. A subscriber enters a code for a desired selection into a presentation player connected to the channel, and the address of the subscriber's television set is made a part of the stream of digital signals on the channel. The selected program is then automatically downloaded to the subscriber's television set as the program is broadcast on the channel.

Use of telephone lines or other land lines to transmit in real time a television program, chosen by a subscriber from a list of stored programs, at a time chosen by the subscriber, is disclosed by Monslow et al in U.S. Pat. Nos. 4,890,320 and 4,995,078.

McCalley et al, in U.S. Pat. Nos. 5,119,188 and 5,191,410, disclose transmission of a television program, chosen by a subscriber from a list of such programs for viewing on the subscriber's television screen, and consisting of compressed digital video and digitized audio signals that are subsequently combined. The subscriber enters selections through a touch tone telephone. The transmitted data may be reformatted for more convenient transmission to and viewing by the subscriber. Transmission of encoded and compressed audio and video signals for a subscriber-chosen program for later playback, is disclosed by Yurt et al in U.S. Pat. No. 5,132,992.

U.S. Pat. No. 5,172,413, issued to Bradley et al, discloses provision of a hand-held and hand-operated control device that allows a subscriber to review a listing of television programs available from a library, choose a selection from the library, choose a method of transmission of a selected program, and order certain advertised consumer goods. Different libraries, each containing one or more classes of programs, can be contacted to request delivery of subscriber selections. Transmission of the selections is by a cable television channel.

Use of a long distance telephone switching system to provide audio news, conference calling, voice messaging, message store-and-forward, inclusion of pre-recorded scripts, speed dialing, and retrieval of stored subscriber billing, as chosen by a subscriber using codes entered through a touch tone telephone, is disclosed by McLeod et al in U.S. Pat. No. 5,222,120.

A system for transmitting and receiving compressed and encoded digital audio signals over a cable television network is disclosed in U.S. Pat. No. 5,239,540 and 5,406,558, issued to Rovira et al. A subscriber's television set receives, decodes and decompresses the signals for subsequent playback. Transmission of encoded and compressed digital signals for subsequent playback and/or recording on audio or video tape is disclosed by Yurt et al in U.S. Pat. No. 5,253,275.

Transmission of pay-per-view television programs to substations for recording and subsequent retransmission upon subscriber order is disclosed by Haave et al in U.S. Pat. No. 5,367,330. Scheduling of transmission of a program for subscriber consumption is controlled at a central station.

Walters et al disclose use of burst transmission of compressed video/audio programs, chosen from a list of stored programs, to a group of subscribers according to subscriber schedules in U.S. Pat. No. 5,440,334. The subscriber receives, downloads, decompresses and stores the selected program(s) for subsequent playback at the subscriber's convenience.

These approaches usually combine video and audio data so that the video requirements control the choice of transmission system, or the selection of audio information is limited to features closely associated with use of a telephone. These approaches do not provide transmission and storage of a wide variety of audio-only information in a format that takes advantage of unique features of audio format information.

What is needed is a procedure for packaging, delivery, reception, storage and playback of audio files in a format that (1) allows transmission of the audio files at transfer rates many time higher than the normal audio playback rates, (2) allows receipt and storage of the audio files in compressed formats that can store several hours of normal audio programming in a playback medium of modest size, (3) allows transmission of audio files to the user at times and manners that are convenient for both the sender and the recipient, and (4) allows the user to conveniently transport the stored audio files, for playback at a time chosen by the user.

SUMMARY OF THE INVENTION

The invention meets these needs by providing a portable digital audio playback module for digital audio file receipt and storage, D/A conversion and playback. The audio programming material ("audio data files" herein) are digitized and compressed before transfer over a hardwired or wireless communication channel to the storage/playback module, using any suitable compression algorithm. The module is capable of receiving and recording compressed, digitized audio programming at a transfer rate that is at least two times the normal audible playback rate so that, for example, ten hours of playback material may be transferred in a time interval of less than ten minutes to a few hours, using transfer procedures and times that do not interfere with the user's normal workday. The rate of data transfer depends upon the communications link used and ranges from about twice the normal playback rate to about 100 times the playback rate. These communications links include POTS (plain old telephone service) lines, ISDN lines, cable television links, satellite broadcast links and other similar links. Once an audio data file is received by the user, this file can be decompressed and converted to analog format for playback at a normal rate by the user. The audio data files are received by the user and stored digitally on a non-volatile medium in a removable hard drive disk, such as the Iomega Zip drive, a Bernoulli or Syquest removable hard drive, a removable hard drive configured as a PCMCIA card, or a similar portable digital storage device.

In contrast to a conventional digital audio storage system, such as as Digital Audio Tape (DAT), the invention uses a different storage medium, provides random access search ability, rather than linear search capability, and receives and stores information in a compressed format that uses a chosen data compression algorithm. In contrast to a writeable audio storage device, such as the Sony recordable mini-CD, the invention uses a different storage medium, a removable hard drive, has intentionally limited audio bandwidth (stereo full fidelity is not provided or needed), and includes a novel integrated data communications protocol and data exchange port, including a modem, for automatic program material acquisition.

The invention combines the remote data access capability resident in a personal computer with a set of tailored, streamlined control functions to simplify and automate a seamless process for selecting, receiving and playing back audio data files, at times and places chosen by the user, with easily implemented control functions; and with a user interface that allows downloading of the compressed and digitized audio data files in a variety of formats.

DESCRIPTION OF BEST MODES OF THE INVENTION

Figure 1:
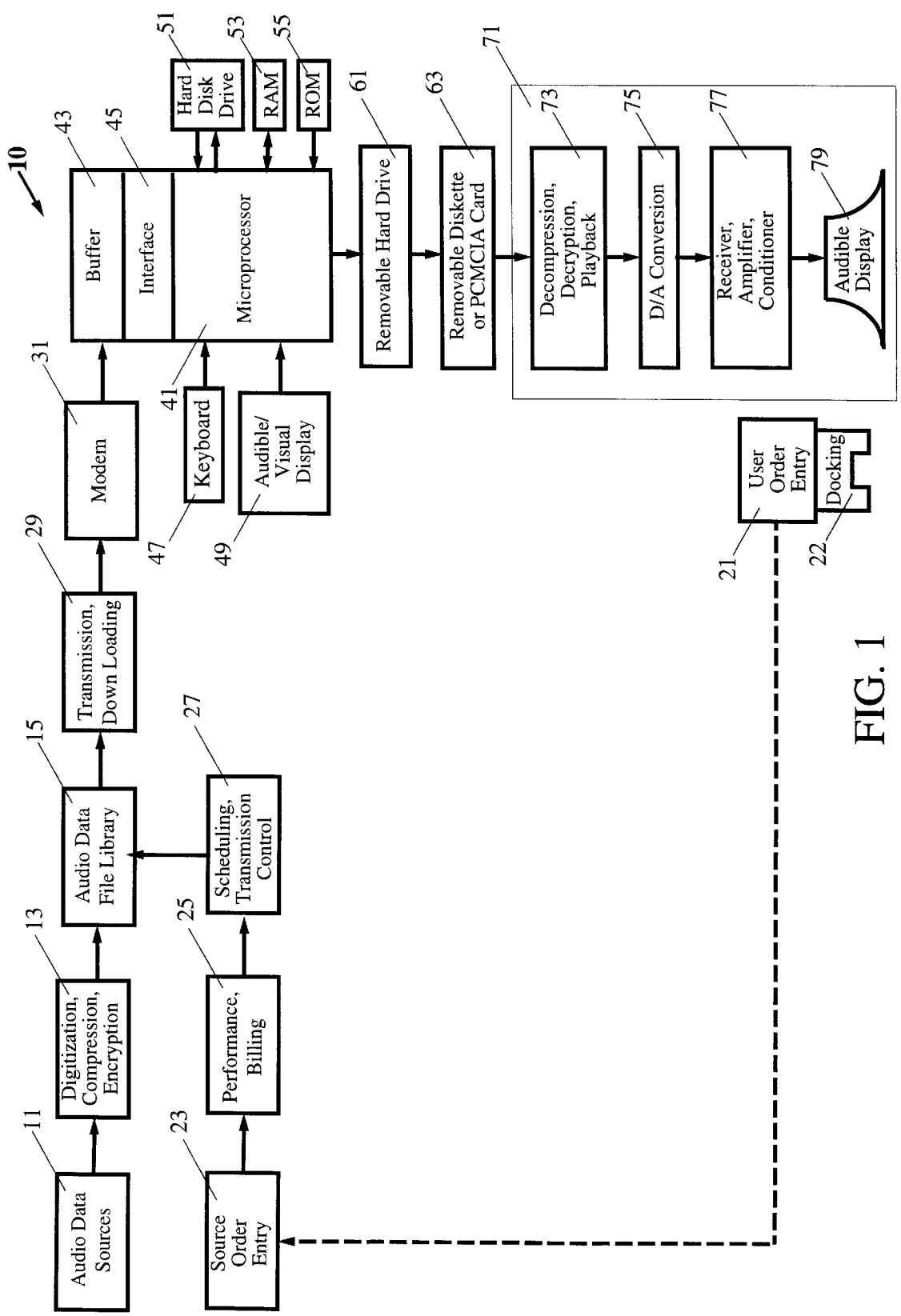
FIGS. 1, 2, 3, 4, 5 and 6 are schematic views of a subscription/on-demand information delivery system according to six embodiments of the invention.

FIG. 1 is a schematic view of a subscription/on-demand information delivery system 10 according to an embodiment of the invention. The system 10 is disclosed in part in the following co-pending patent applications, both of which are commonly assigned to Information Highway Media Corporation, the assignee of the present application: N. Schulhof, J. Janky, "System for Distributing Subscription and On-Demand Audio Programming," U.S. Pat. No. 5,572, 442; and N. Schulhof, J. Janky, "Apparatus for Distributing Subscription and On-Demand Audio Programming," U.S. Pat. No. 5,557,591.

An audio program distribution system 10 includes a plurality of audio data sources 11, each containing a plurality of audio data files available in one or more digital formats. Selected audio data files in the sources 11 are passed through an audio data conditioning module 13 for digitization, compression and encryption (optional) and are then received by an audio data file library 15 for storage and subsequent use. The audio data file library 15 may be implemented in any known digital storage technology, for example as a plurality of digital storage media, such as ultra fast hard drives. Audio data material may be deposited in the library 15 from a variety of audio data sources using a variety of data communications media and formats from a plurality of locations, for example via modem transfer from a distributor, such as the Wall Street Journal. The audio data files are preferably digitized and compressed, using a selected compression algorithm and format, before such files are deposited in the library 15.

One important anticipated use of the invention is to provide or implement an audio subscription service. For example; an audio program, created for radio or television, could be digitized and stored in an audio data file library for subsequent download and playback. Alternatively, selected portions of a daily newspaper, such as the Wall Street Journal or the New York Times, may be scanned in and digitized as an audio version, that is then delivered to the library. Used in this manner, the system 10 may provide daily delivery of a program in audio format that allows a subscriber to listen to the audio material without interruption by commercial breaks or other unwanted communications, that is not truncated to fit into a tight broadcast schedule, and that does not require dedication of the user's sense of sight, touch or other faculties, except for hearing. The user can, optionally, listen to the playback and simultaneously perform other tasks.

The audio data distribution system 10 allows a subscriber/user to select desired programs, utilizing a user order entry module 21 that may include a wired or wireless telecommunications or other radiowave channel, and to be charged only for programs delivered by the distribution service. The user order entry module 21 may be integrated with a user module 71 that is discussed later. The user's order is received by a source order entry module 23 and is passed to a performance and billing module 25 to indicate the audio data files selected by the user and to arrange for billing of the user for delivery of these files. The performance and billing module 25 transmits a signal indicating the audio data files selected by the user to a scheduling and transmission control module 27, which communicates these selections to the library 15 and schedules transmission or downloading of the user-selected audio data files. The selected audio data files are delivered through a transmission and/or downloading channel 29 and optional modem 31 to a microprocessor 41, for deposit in a physical form that is convenient for the user. During data transmission or downloading, audio program files are transferred from the library 15 to the microprocessor 41 at rates 2–100 times as large as the normal rates ($\approx$6–32 kilobits/sec) for real time playback.

The transmission and/or downloading channel 29 of the audio data delivery system 10 may be chosen to take advantage of any of several existing data delivery infrastructures. The delivery system 10 is well suited for use with audio data delivery means such as cable television, interactive cable, plain old telephone service (POTS), ISDN, and broadcast satellite distribution. Examples of such distribution vehicles, as well as new and emerging forms of distribution are discussed in D. Deloddere, W. Verbiest, H. Verhille, "Interactive Video on Demand," IEEE Communications, May 1994, pp. 82–86; in R. Jones, "Baseband and Passband Transport Systems for Interactive Video Service", IEEE Communications, May 1994, pp. 90–101; in J. Careless, Surfing Among the Stars," Via Satellite, December 1995, pp. 30–31; and in P. Baran, "Satellite Communications System and Apparatus," U.S. Pat. No. 4,455,651. Compression of the audio data files may be implemented by use of the G.722 or Dolby AC-2 or AC-3 compression schemes or by other suitable audio compression schemes.

In practice of the invention, information is loaded into the device at a faster-than-real time rate, and thereafter reproduced at real time rate and thereafter reproduced at real time rate. The compression algorithms used in the herein-described system are similar (or may be identical) to those developed by the Motion Picture Experts Group, referred to as MPEG-1 and MPEG-2. Other known compression algorithms include G.722, pioneered by AT&T. These compression techniques provide specific algorithms in which audio is digitized and then compressed a great deal. Maximum compression achieved to date for audibly perceptible programming is about 6–6.5 kilobits/sec. Typical compressed but high-quality audio data rates lie somewhere between 16 and 32 kilobits per second.

The invention uses fast (e.g., 10 Mbits per second) delivery systems that are available to efficiently deliver video material. Although a single frame of video data on a television screen requires at least 1–2 Mbytes of data, an equivalent amount of audio data (approximately 0.03 sec at 32 kilobits/sec) can be provided using about 10 kbytes of data, a reduction of three to four orders of magnitude compared to the video data requirements. Thus, a 100-Mbyte diskette can provide up to three hours of audio data for a user.

The audio data transmission and/or downloading channel 29 routes the selected audio data file(s) to the microprocessor 41 using any suitable communication means, such as a cable television system or a telephone line, or the program material may be routed directly to the subscriber via satellite broadcast, as discussed above.

Communications protocols for implementing this service are available and well known in the art. Two examples are point-to-point protocol (PPP) and transmission control protocol/internet protocol (TCP/IP), used for communications on the Internet. The data transmission control process is well understood and is available in software as part of the products offered by Netscape, NetCom, America OnLine and Compuserve, among others. Terminal emulators, such as a microphone and PC phone are available and well known to users of personal computers (PCs). The expansion of Internet activity has led to widespread development of many such communications packages for use on PCs. By design, the transmission protocol used in the transmission and/or downloading channel 29 is matched by a similar protocol that resides in the subscriber's PC. Matching of these two protocols allows high speed data transfer of audio files from the audio delivery system 10 to the subscriber.

The audio files are received and buffered by a buffer 43 and universal interface 45 at the microprocessor 41 and are downloaded and recorded on a removable high density diskette or PCMCIA card 63 (referred to collectively as a "diskette" for convenience here) through a removable hard drive 61 (optionally portable). Optionally, a keyboard 47 for entry of commands, a visual or audible display 49, such as a monitor or speaker, a conventional hard drive 51, a RAM module 53 and/or a ROM module 55 are connected to and communicate with the microprocessor 41.

The removable hard drive 51 may be any commercially available unit, such as an Iomega Zip drive, a Bernoulli Box, a Syquest external hard drive, or a 260-Mbyte PCMCIA card made by Epson and mounted on the microprocessor 41. The characteristics of a PCMCIA card are discussed below. The diskette 63 is delivered to and carried by the user until the user has an opportunity to play back part or all of the audio file(s) on the digital casette playback unit 71.

For diskette playback, the user inserts the diskette 63 into a user module 71 (preferably portable) that includes an audio file decompression, decryption (optional) and playback module 73, a digital/analog conversion module 75, a receiver, amplifier and audio conditioner module 77, and an audible display module 79, such as a speaker. Optionally, the removable diskette or PCMCIA card 63 may be integrated with the user module 71. Optionally, the user module 71, the removable hard drive 61 and the removable diskette or PCMCIA card 63 may be fully integrated in a consumer oriented package. This package can be portable or can be attached to or mounted on a vehicle, either as a separate diskette playback unit or as part of another playback unit, such as an integrated AM/FM cassette stereo or CD player, or as part of an in-vehicle computer system.

Figure 2:
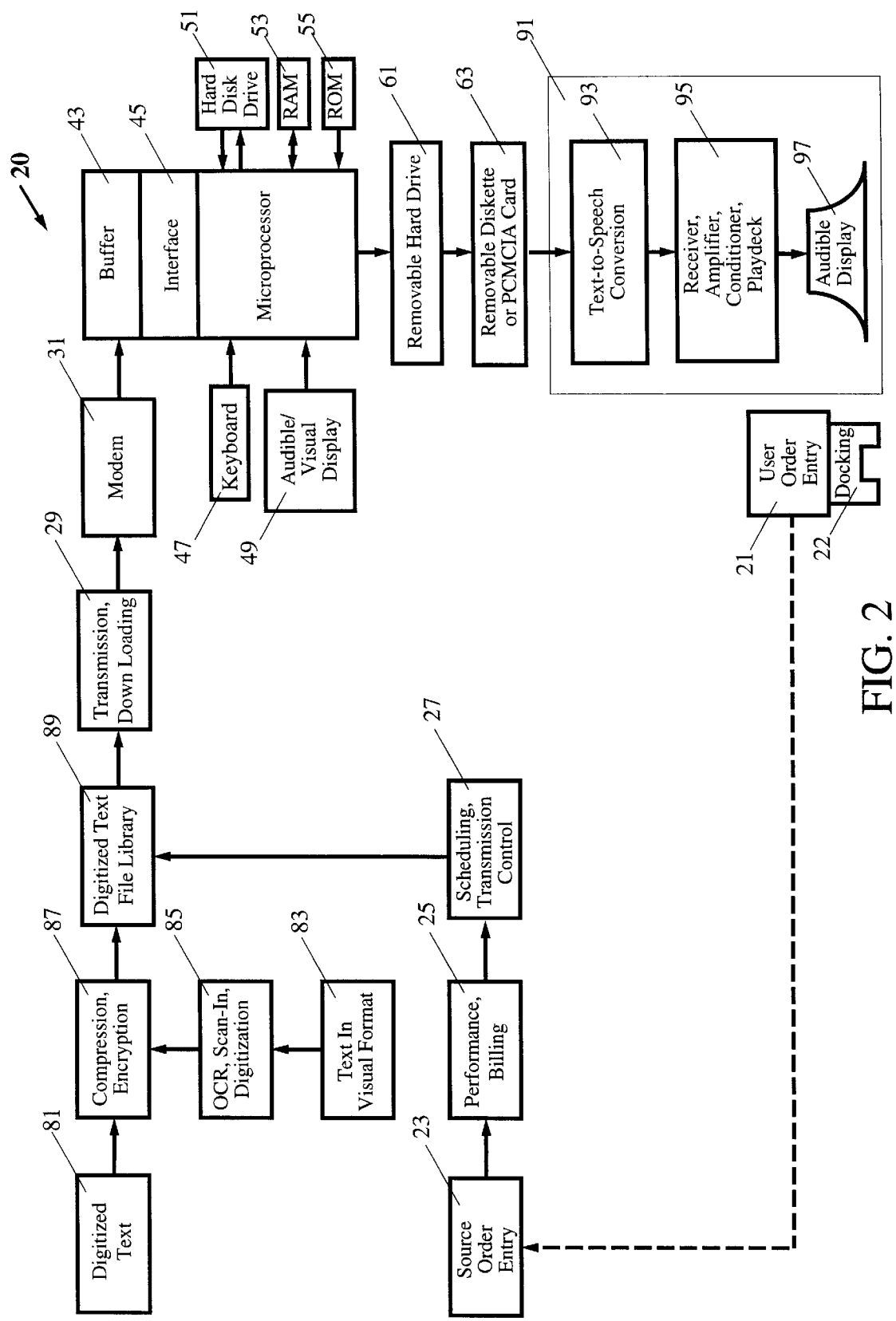

FIG. 2 illustrates a second embodiment of the invention. A user order entry module 21, source order entry module 23, performance and billing module 25, and scheduling and transmission control module 27 operate as in FIG. 1.

In this second embodiment, the source of the audio data files may include digital text sources 81 (stored as ASCII characters) and sources of text in visual format 83. The text in visual format is passed through a scan-in, OCR and digitization module 85, and the output signals from the module 85 are in substantially the same digital format as the digital text in the digital text sources 81. All digital text from the sources 81 and 83 is passed through a compression module 87 for compression and encryption (optional) and is stored in a digital text file library 89. The scheduling and transmission control module 27 communicates with the digital text file library 89 and schedules transmission and/or downloading of selected digital text files through a transmission/downloading channel 29 and a modem 31 (optional).

The digital text files selected by the user are received by a microprocessor 41 with input buffer 43 and universal interface 45 that operate as in FIG. 1. These digital text files are downloaded and recorded on a removable high density diskette or PCMCIA card 63 (a "diskette") through a removable hard drive 61 that operate as in FIG. 1. Again, the diskette 63 is then delivered to and carried by the user until the user has an opportunity to listen to part or all of the audio file(s) recorded on the diskette.

For diskette playback, the user inserts the diskette 63 into a user module 91 that includes a digital text-to-speech conversion module 93, a receiver, amplifier, audio conditioning and playback module 95 and an audible display module 97, such as a speaker. Digital text-to-speech software programs are available from several commercial sources, including IBM, Apple, Accu-Voice (San Jose) and DSP Group (Santa Clara). These programs operate on a variety of platforms, including Intel, Motorola and DSP processors.

Figure 3:
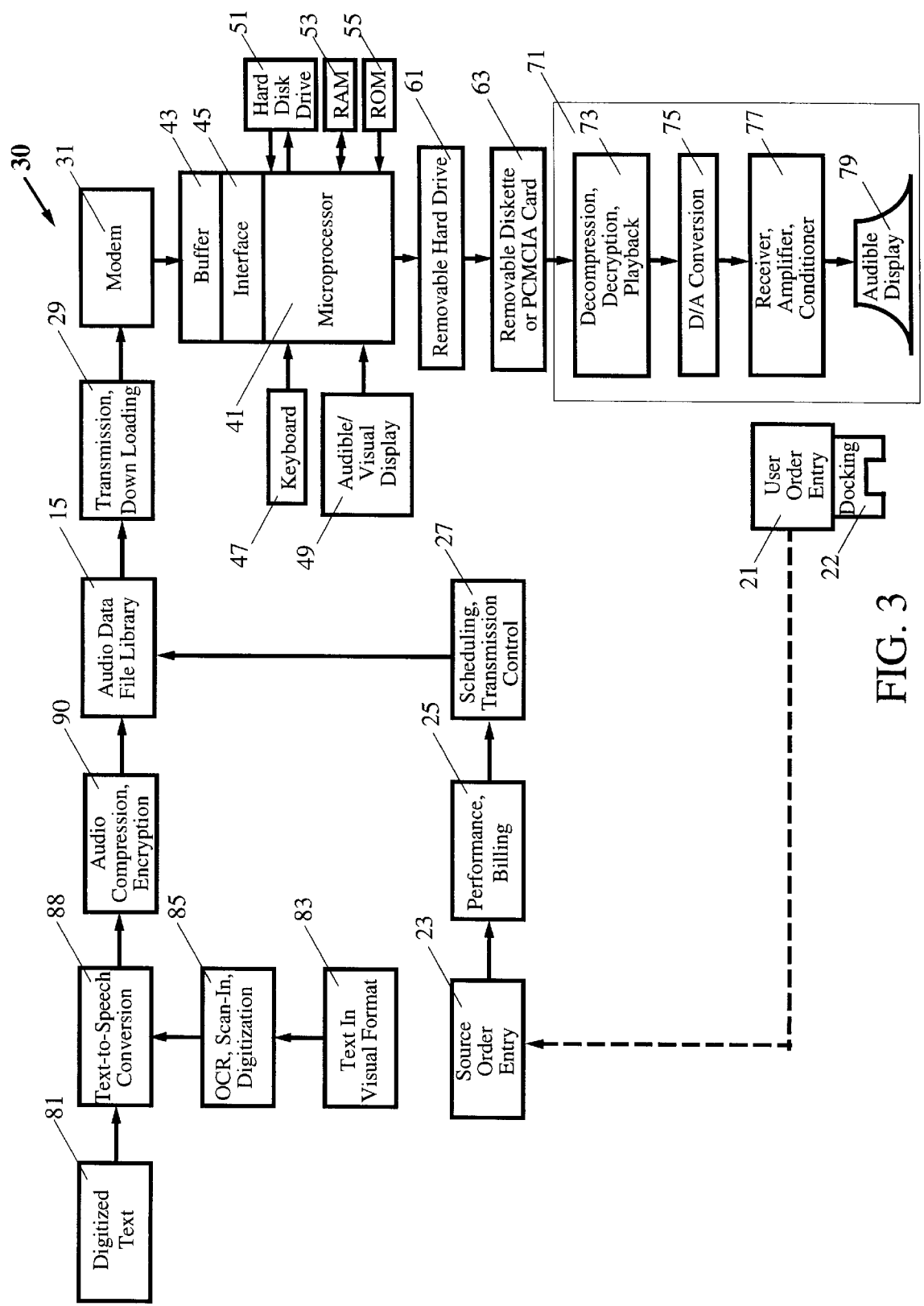

FIG. 3 illustrates a third embodiment of the invention. A user order entry module 21, source order entry module 23, performance and billing module 25, and scheduling and transmission control module 27 operate as in FIG. 1.

In this third embodiment, the source of the audio data files may include digital text sources 81 and sources of text in digital format 83. The text in visual format is passed through a scan-in, OCR and digitization module 85, and the output signals from the module 85 are in substantially the same digital format as the digital text in the digital text sources 81, as in FIG. 2. All digital text from the sources 81 and 83 is passed through a digital text-to-speech conversion module 88 and through an audio compression and optional encryption module 90 and is received by an audio data file library that operates as in FIG. 1. Text-to-speech conversion may be implemented, for example, by use of a conversion scheme offered by Accu-Voice. The scheduling and transmission control module 27 communicates with the audio data file library 15 and schedules transmission and/or downloading of selected digital text files through a transmission/downloading channel 29 and a modem 31 (optional), as in FIG. 1.

The audio data transmission and/or downloading channel 29 routes the selected audio data file(s) to the microprocessor 41 using any suitable communication means, as in FIG. 1. The audio files are received and buffered by a buffer 43 and universal interface 45 at the microprocessor 41 and are downloaded and recorded on a removable high density diskette or PCMCIA card 63 (a "diskette") through a removable hard drive 61. The diskette 63 is then delivered to and carried by the user until the user has an opportunity to listen to part or all of the audio file(s) recorded on the diskette.

For diskette playback, the user inserts the diskette 63 into a user module 71 that includes an audio file decompression, decryption (optional) and playback module 73, a digital/analog conversion module 75, a receiver, amplifier and audio conditioner module 77, and an audible display module 79, such as a speaker. Optionally, the removable diskette or PCMCIA card 63 may be integrated with the user module 71. Optionally, the user module 71, the removable hard drive 61 and the removable diskette or PCMCIA card 63 may be integrated.

Figure 4:
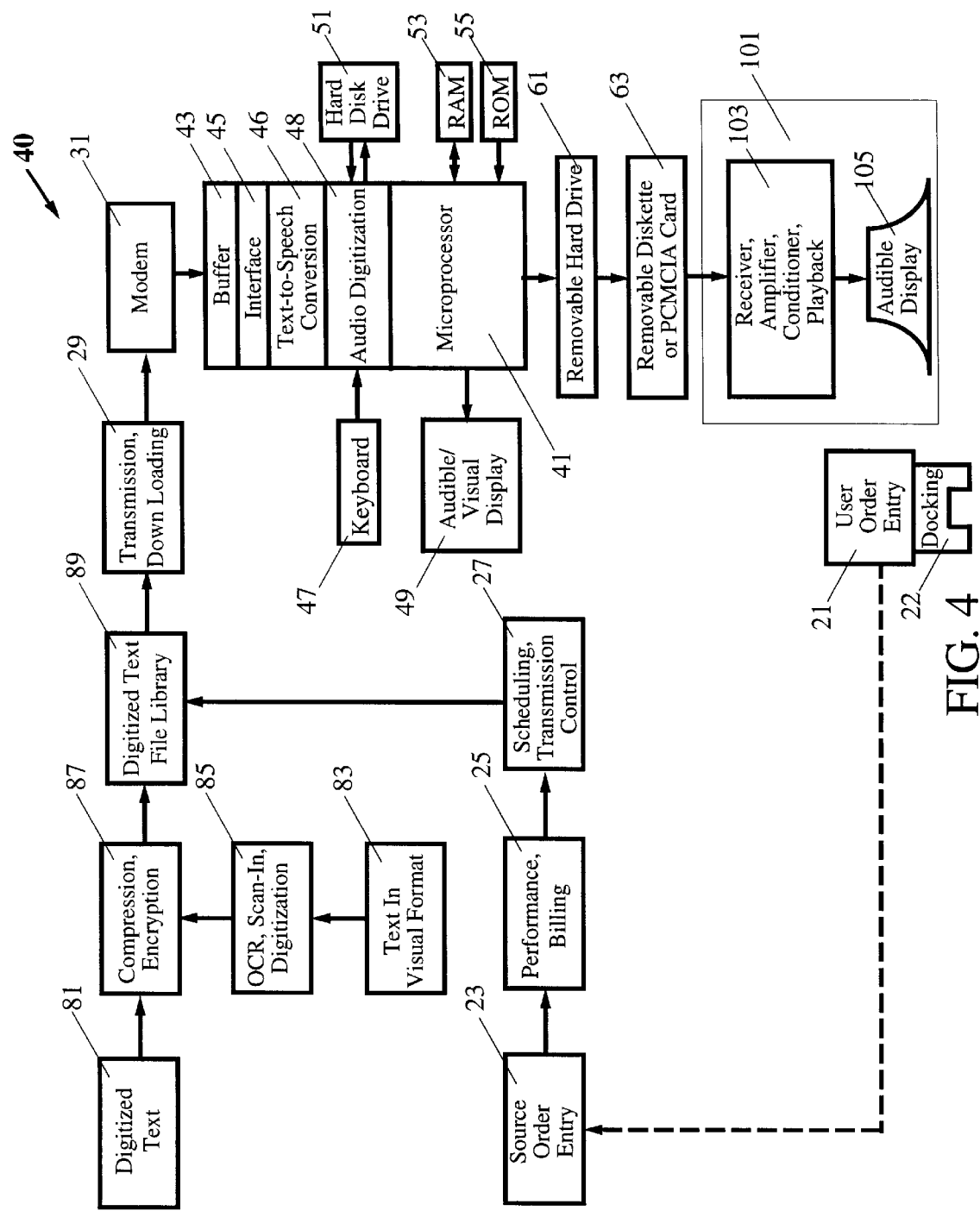

FIG. 4 illustrates a fourth embodiment of the invention. A user order entry module 21, source order entry module 23, performance and billing module 25, and scheduling and transmission control module 27 operate as in FIG. 1.

In this fourth embodiment, the source of the audio data files may include digitized text sources 81 and sources of text in digitized format 83. The text in visual format is passed through a scan-in, OCR and digitization module 85, and the output signals from the module 85 are in substantially the same digitized format as the digitized text in the digitized text sources 81. All digitized text from the sources 81 and 83 is passed through a compression module 87 for compression and encryption (optional) and is stored in a digitized text file library 89. The scheduling and transmission control module 27 communicates with the digitized text file library 89 and schedules transmission and/or downloading of selected digitized text files through a transmission/downloading channel 29 and a modem 31 (optional).

The digitized text files selected by the user are received by a microprocessor 41 with input buffer 43 and universal interface 45 that operate as in FIG. 1. These digitized text files are then passed through a digitized text-to-speech converter 46, and the audio files are downloaded and recorded on a removable high density diskette or PCMCIA card 63 (a "diskette") through a removable hard drive 61 that operate as in FIG. 1. Again, the diskette 63 is then delivered to and carried by the user until the user has an opportunity to listen to part or all of the audio file(s) recorded on the diskette.

For diskette playback, the user inserts the diskette 63 into a user module 101 that includes a receiver, amplifier, audio conditioning and playback module 103 and an audible display module 105, such as a speaker.

Data connections to which the user order entry module 21 is adapted include: a telephone modem system connected via a standard telephone system to an Internet access connection, either directly or through a personal computer; a specialized data modem for use with a high communications channel, such as an ISDN data link; and a direct broadcast satellite digital television receiver system. Appropriate communications protocols and formats are stored in a system memory, which may include a read-only memory, flash memory, or other memory, or the communications protocols may be stored on the hard disk drive 51 of the microprocessor 41. Such protocols and formats are accessed as appropriate under control of the microprocessor 41.

The microprocessor 41 controls storage and data retrieval functions, provides communications interface control for a high speed sending data source, provides communications interface control to a bidirectional low speed source, supervises order entry functions and order placement, and controls digital-to-audio conversion functions for playing back an audio program stored in a data file. The microprocessor 41 includes a series of standard microprocessor elements that store a plurality of executable subroutines, for example, in a read-only memory, as discussed above.

Figure 5:
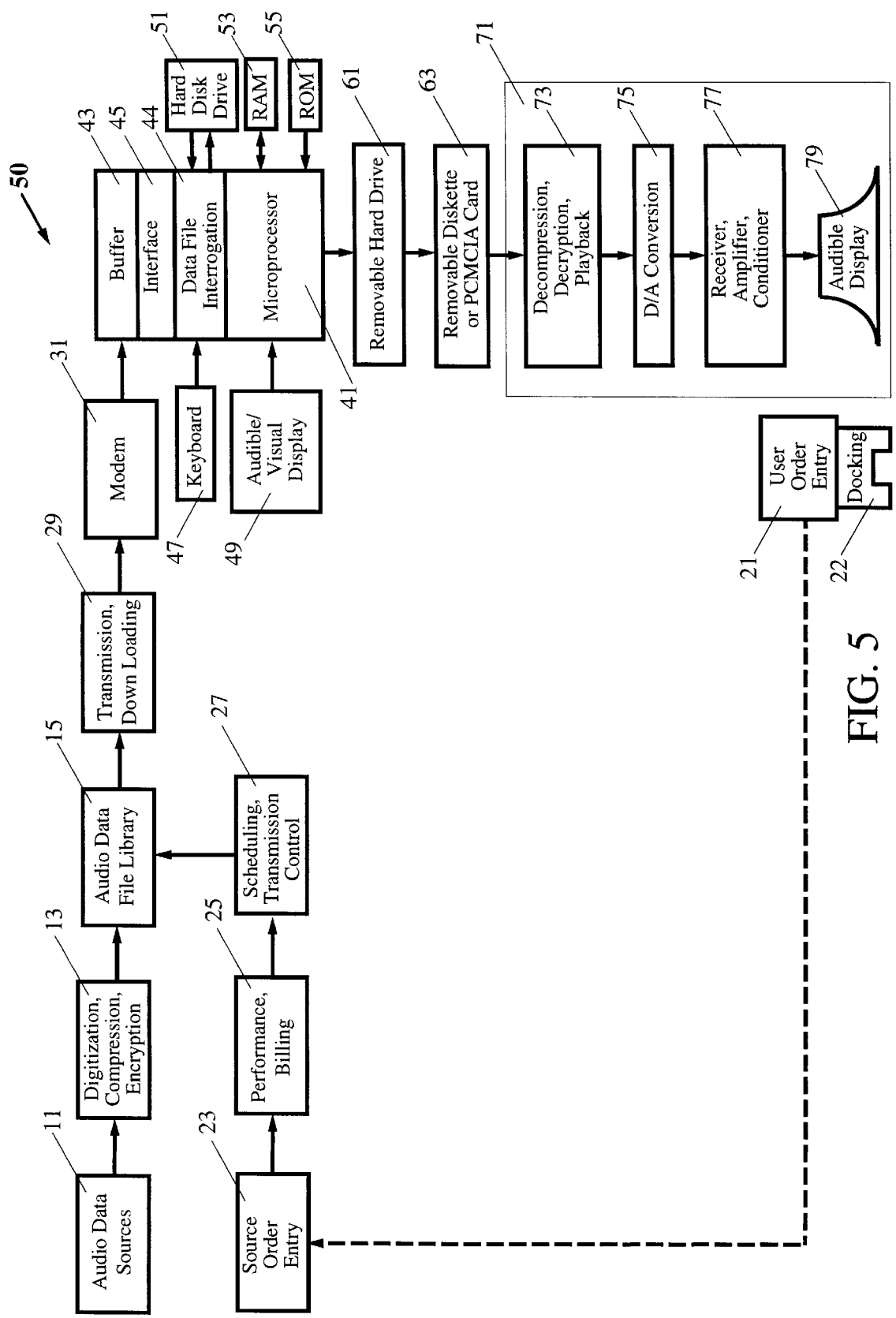

In a fifth embodiment, shown in FIG. 5, a microprocessor 41 receives audio data files in the form of E-mail messages that have been accumulated, digitized and stored for subsequent retrieval by the user. An E-mail file will usually include a routing sub-message, appended as a header at the beginning (or as a trailer at the end) of the file, that specifies the route followed by the audio message in moving from the audio message source (the person or machine that left the message in E-mail form) to the intended recipient's telephone answering machine or service. These routing headers include specification of each bridge, router, gateway, etc. passed through by the E-mail message and can be quite long. In some instances, the length of a routing header can be many times the length of the useful part of the message. A routing header that requires 16 lines or more of text to print out is not unusual.

In this fifth embodiment, the routing header, and any other header information that is specified by the user, is stripped from the message so that only the portion of the E-mail message that is of interest to the user is recorded on a diskette (or PCMCIA card) 63. An audio data file is received by and passed through a buffer 41 and data interface 43 as in FIGS. 1, 2, 3 and 4. The audio data file is then interrogated by an E-mail interrogation module 44 that "reads" and temporarily stores the incoming signal and determines if the incoming signal contains routing header information that characterizes a digitized E-mail message. If the interrogation module 44 determines, usually in retrospect, that the incoming signal is an E-mail message, the module 44 discards each byte of the routing header sub-message until it reaches the end of the routing header, usually indicated by a special end-of-routing-information character or group of characters. After the interrogation module 44 reaches the end of the routing header, the module accumulates the remainder of the message for subsequent recording on a diskette 63. Optionally, an incoming signal containing an audio data file can be temporarily stored on a hard disk drive 51, before or after the incoming signal is passed through the interrogation module 44. The audio data file (E-mail message) recorded on the diskette 63 now does not contain the long-winded routing header information. The removable diskette or PCMCIA card 63 is then received by the user and playback as in the embodiments shown in FIGS. 1 and 3.

The interrogation module 44 in this fifth embodiment assumes that every incoming signal is potentially an E-mail message or a collection of E-mail messages. If the interrogation module 44 reaches the end of an incoming signal, usually indicated by a conventional EOF character or characters, without finding an end-of-routing-information character or characters, the interrogation module treats the temporarily stored signal as not containing an E-mail message and accumulated the entire signal for recording on the diskette 63. The fifth embodiment thus expands the types of audio files that can be received, recorded and played back in the embodiments shown in FIGS. 1 and 3.

Figure 6:
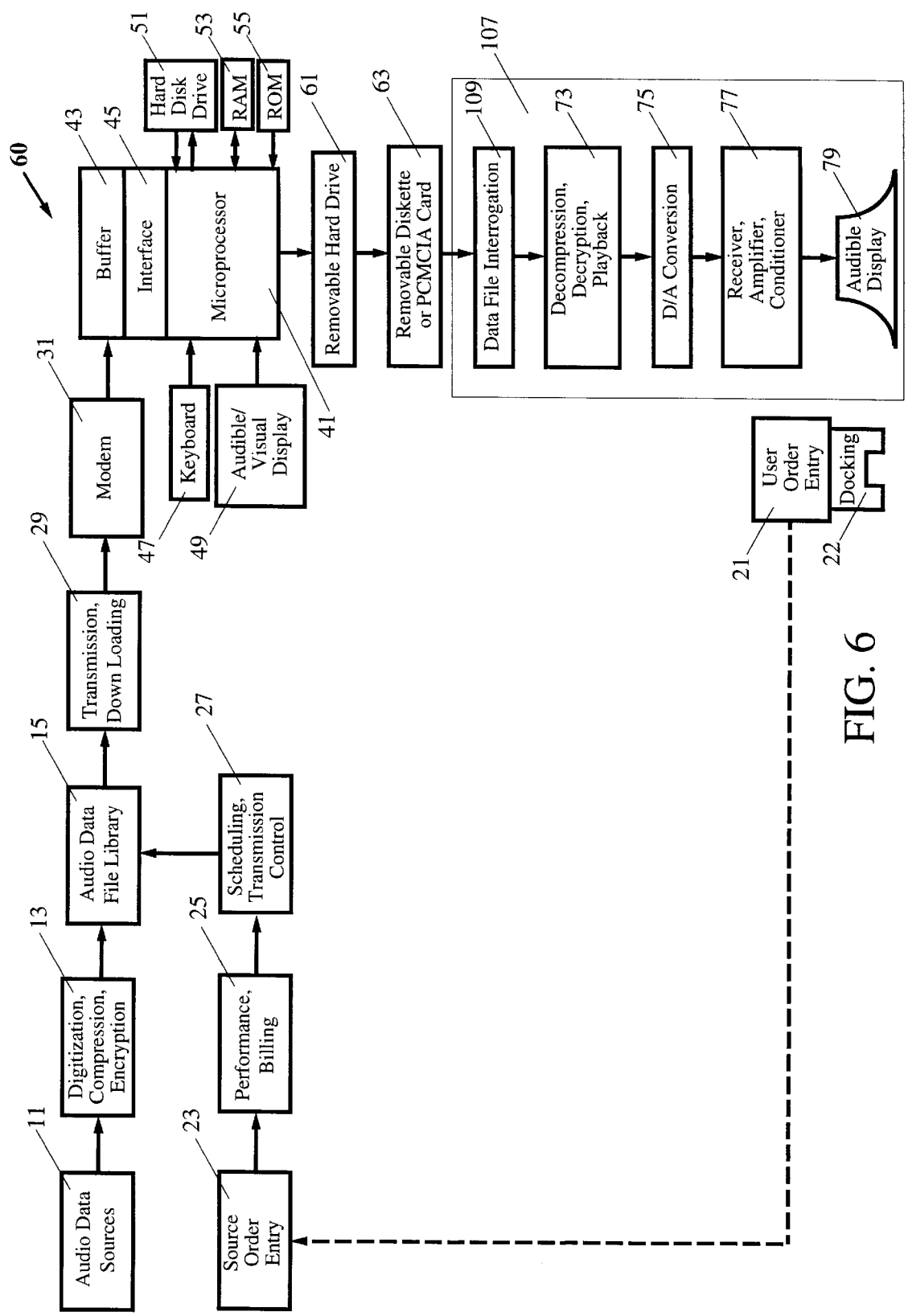

In a sixth embodiment, illustrated in FIG. 6, the E-mail interrogation module 44 is removed from the microprocessor 41 and becomes, instead, an E-mail interrogation module 109 that is part of a user module 107. The interrogation module 109 receives a data file from the removable diskette 63, either before or after the data file is processed by a decompression, decryption and playback module 73, and examines and temporarily stores each byte in an incoming data file to determine whether the data file contains one or more E-mail messages, as in the fifth embodiment. If the interrogation module 109 finds a character or group of characters that serves as an end-of-routing-information indicator, the interrogation module discards the preceding routing header and processes the remainder of the E-mail message, as in the fifth embodiment.

One advantage to compression and digitization of an audio data file is that lossy, as opposed to lossless, compression techniques can be utilized to obtain effective compression ratios of between 2:1 and 100:1 or higher in the compressed audio data file. When the audio data file is decompressed, high fidelity reproduction of the speech content is not sought, and a small amount of ambiguity in the speech is tolerable. The speech synthesizer used in the audible display 79 or 97 in FIGS. 1, 2 or 3 optionally uses a male voice with a limited bandwidth, such as the 300–3400 Hz band used for transmission of voice by a conventional telephone line.

As illustrated in FIGS. 1, 2, 3, 4, 5 and 6, the invention operates in a system that allows a user/subscriber to: (1) select audio program material from a remotely located audio data file or digitized text file library; (2) make the selection when the subscriber wishes to do so; (3) receive and record the material via a variety of communications means at a rate much higher than the real time playback rate so that the time delay for receipt of the material is relatively short; (4) transport the recorded audio data file(s) using a handheld storage mechanism; and (5) perform playback at any desired time.

In one alternative in FIGS. 1, 2, 3, 4, 5 and 6, the selected audio or text data files are recorded on a removable diskette 63 and the diskette is delivered, by the U.S. Postal Service, Federal Express, United Parcel Service, Airborne Express, Emery or another courier to the user. This alternative is suitable for filling orders in a subscription service, where the user has a standing order for a diskette 63 that contains recordings of certain periodic events, such as a weekly music concert or a daily business news broadcast. Here, it is sufficient that the diskette 63 with the selected recordings thereon reach the user within, say, one to two days after the last recording has been made. This alternative avoids use of a communications link for delivery of the diskette 63 to the user and creates a transportable digital analogue to the transportable magnetic tape wheel, but with much higher recording density.

The user module 71 or 91 or 101 in FIGS. 1, 2, 3, 4, 5 and 6: accepts digital data from a plurality of sources according to prearranged formats for both the data structure and the physical interface; controls the storing process in a digital data storage device; responds to commands initiated from a keypad to execute various functions, including playback of audio programming that has been stored in a digital format in a file; enters catalog numbers of audio programs to be ordered; and responds to specialized commands for reconfiguration of operating modes, according to a prearranged series of options. The system may be operated in any of at least four user-selectable modes.

User Setup, Order Entry and Audio Selection

Figure 7:
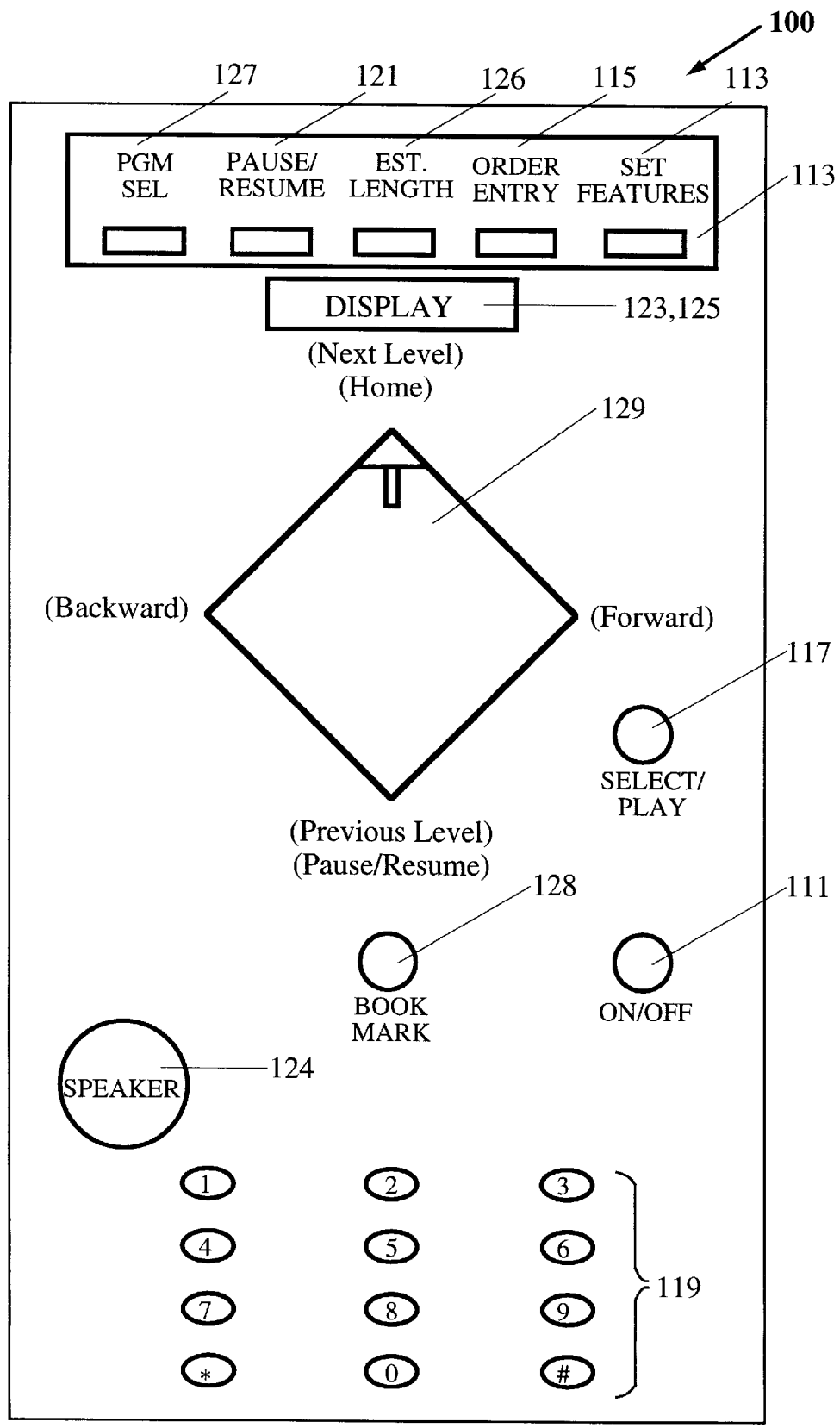
FIGS. 7 and 8 illustrate a handheld module through which control can be exercised by the user according to the invention.

FIG. 7 illustrates a control module 100 for the portable user module 71 or 91, 101 or 107 (FIGS. 1, 2, 3, 4, 5 and 6), showing an initial mode of operation according to the invention. In the user setup/order entry mode, the user can configure the system to follow certain canonical paths through a built-in menu system, or the user may execute immediate jump-to commands. In this mode, the user can also configure the system for the desired communications access, and may also enter a personal user profile of automated features. In this way, the user may create an intelligent agent that automatically services the user's order and retrieval needs. For example, if the user is interested in listening to all regularly published information on a particular topic, the agent can be programmed to collate all such information for the user's review.

When the user wishes to make a selection for a next download of program material, the user activates the system by pressing an on/off switch 111, and then selects a profile of features, using a "set features" key 113 for the system, and/or selects an Order Entry mode, using an "order entry mode" key 115 and an order select key 117. The user next copies order entry numbers for the desired audio programs from a catalog or schedule into the system using the keypad 119, marking the end of each selection with entry of a pound sign (#), a star sign (*) or other special symbol entry. The new requests may be stored in either solid-state memory or hard drive memory in the system until the requests are transferred to the order entry module 21 (FIGS. 1, 2, 3, 4, 5 and 6) upon activation of the Order Entry mode. At any time during this operation, the user may pause and thereafter resume operation of the system by pressing a Pause/Resume key 121. Pause and resume modes of operation are indicated on a visual display 123 (e.g., a visual screen) and/or an audible display 125 (e.g., a loudspeaker 124, also used for user playback) by a "resume" indicator. Program selection can be entered using a "program select" key 127. An estimate of the length of time required for real time playback of the user selection can be requested, using an Estimated Replay Length key 126, and this estimated time length can be displayed on the display 123 and/or 125. The user navigates through the system using a four-position command panel 129, optionally shaped as a quadrilateral or other polygon, to change selection levels or to move forward or backward on the present selection level. The right vertex (left vertex) of the quadrilateral is pressed to move the diskette forward (backward) from its present position; and the top vertex (bottom vertex) is pressed to move the diskette to the next level (previous level) in the hierarchy. Optionally, a bookmark entry key 128 is provided to mark a place in an audio selection to which the user wishes to return. User selection is preferably transmitted to the source order entry module 23, shown in FIG. 1, by connecting the control module 100 to a docking station 22, also shown in FIG. 1, and transmitting the order by telephone/modem to the source entry module.

Figure 8:
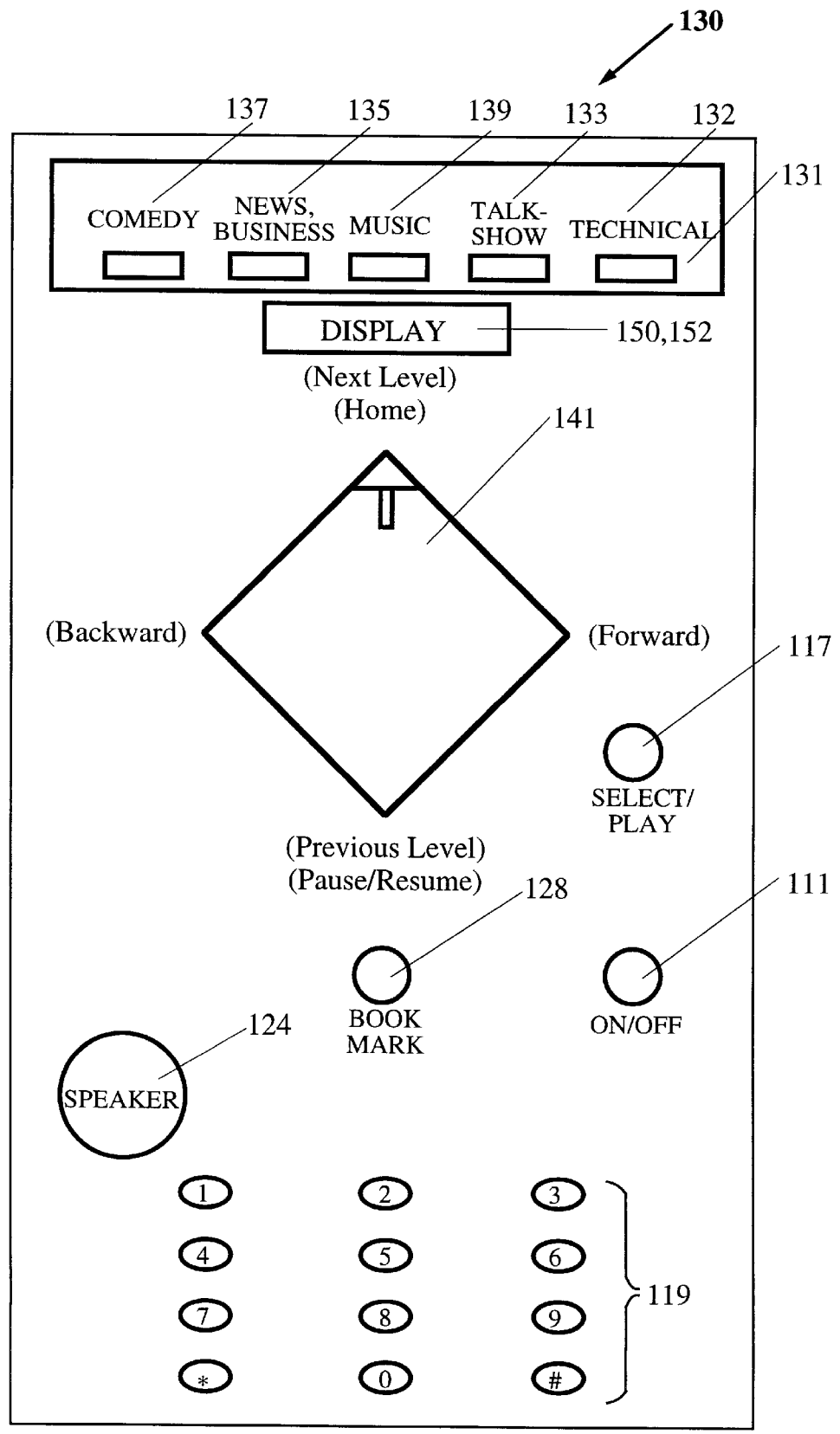

FIG. 8 illustrates another control module 130 for the user module 71 or 91 or 101 (FIGS. 1, 2, 3, 4, 5 and 6), which would facilitate operation of the order/select mode according to the invention. A program select mode panel 131 allows the user to browse selectively through various program categories, then browse through program files within each category by reading descriptions for the titles in a category in a visual display 150 and/or by playback of a short representative section of the selection in an audible display 152. These descriptions may be converted to audio information that is suitable for playback in different audio systems, including the automobile stereo cassette system, another portable audio playback system, or an audio speaker system attached to the digital cassette. The audio mode of information selection and retrieval is especially helpful for persons who cannot read, such as young children, and for visually impaired persons. It is also a benefit to a person operating an automobile, who cannot afford to be visually distracted by trying to read a visual display.

Thus, when information order/select mode is selected, a visual display 150 and/or audible display 152 is used in conjunction with a four-position control panel to navigate through a hierarchical or otherwise organized database of program material. The available audio files are organized in several broad categories, for example, technical 132, talk-show 133, news and/or business 135, comedy 137 and music 139, that are part of the program select mode panel 131. A four-way control panel 141, shaped as a quadrilateral, is used to navigate through a database hierarchy, as in FIG. 7. The right vertex (left vertex) of the quadrilateral is pressed to move the diskette forward (backward) from its present position; and the top vertex (bottom vertex) is pressed to move the diskette to the next level (previous level) in the hierarchy. The control panel 141 may also have a center press position that is used to enter a selection and activate playback; or a Select/Play button 117 may be pressed to enter a selection and activate playback. Additionally, a keypad 119 may be used to navigate through the program database, for example by means of keyboard shortcuts, where a particular keystroke or combination of keystrokes is assigned to a specific database location. Again, optionally, a bookmark entry key 128 may be used to mark a place in an audio selection to which the user wishes to return.

It is expected that order placement and database browsing may take place in real time, although it is also possible to download an updated catalog containing the database of program material each time program material is transferred into the system. In this way, it is not necessary to refer to a separate catalog for a listing of program material, and the expense of printing and distributing such a catalog is eliminated. This approach is also preferred for use by visually impaired persons who cannot visually search a catalog. The specific arrangement of controls and modes of operation in FIGS. 7 and 8 are shown for purposes of illustration and are not intended to limit the scope of the invention to these arrangements.

One embodiment of the input data buffer 43 is a PCMCIA-type format card that includes either or both of the universal communications interface 45 and a telephone modem. Alternatively, an RF receiver/ demodulator, either hardwired or part of a PCMCIA-type card, may be used for wireless communication for either or both of audio program ordering and audio program reception. The system may be left on a desk or in a car and automatically loaded with audio or text program information when not in use.

The PCMCIA card, in its present design, is a 68-pin module, with plug-in being provided by pin-and-socket connectors, with the pins being arranged in two rows of approximately 34 pins each. The card operates with a memory-only interface or with an input/output interface. In a memory-only configuration, the pin assignments include j ground pins ($1 \leq j \leq 4$), k $V_{cc}$ pins ($1 \leq k \leq 2$), data bit pins 0–15, address bit pins 0–25, m card enable pins ($1 \leq m \leq 2$), an output enable pin, a write enable pin, a card detect pin, a card reset pin, n programming supply voltage pins ($1 \leq n \leq 3$), and 7 special purpose pin assignments, including ready/busy pin, write protect pin, register select pin, supply voltage detect pins, write protect pin and reserved pins. In an input/output configuration, the special purpose pins become interrupt request, I/O port bit count (16-bit; yes/no), input port acknowledge, register select, I/O enable, audio digital waveform, card status changed, I/O read and I/O write.

An Execute-In-Place option allows a computer connected to the card to execute programs directly from instructions and/or data provided on the card.

The card uses 3.3 volts or 5 volts supply for $V_{cc}$ and provides 64 Mbytes of memory address space (SRAM, MaskPROM, OTPROM, EPROM, EEPROM or Flash Memory), with retrieval time of 100, 150, 200, 250 or 600 nsec. I/O registers for the PCMCIA card have either 8 bits or 16 bits width. The card thickness may be either 3.3 mm or 5 mm or 10 mm. Card length and width are approximately 85.6 mm and 54 mm, respectively.

The card has five layers of operation standardization. The lowest layer is physical and specifies electrical and card interface characteristics. The second layer, basic compatibility, specifies minimum memory size, minimum memory speed, data structures used, etc., optionally including specification of the Card Information Structure. The third layer, data recording format, specifies how card data are physically organized on the card (blocked vs. unblocked, with or without check sum included, etc.), analogous to format specifications of a floppy disk. The fourth layer, data organization, specifies how data are logically organized on the card, including the operating system used, whether the Execute-In-Place option is used, whether flash file memory is used, and application-specific information. The fifth layer specifies standards that are specific to a particular operating environment. Only compliance with the first two layers is required currently.

In another embodiment of the invention, the input data buffer may include an audio input/digitizer circuit for digitizing live audio and then storing it, as in a conventional tape recorder or mini-CD recorder or DAT recorder.

We claim:

1. Audio information storage and playback apparatus comprising:

a universal data interface to receive a data file as part of an incoming signal, in digitized and compressed format, and to provide automatic data format recognition information for this data file;

a microprocessor, programmed to receive and use the data format recognition information to implement a correct communications protocol to receive and extract the data file from the incoming signal, where the data file is received by the microprocessor at a transfer rate that is at least two times the transfer rate for audibly perceptible playback of information contained in the data file;

diskette recording means, connected to the microprocessor, for receiving a removable diskette, for receiving the data file extracted by the microprocessor, and for recording this data file in a compressed format on the removable diskette;

playback means for receiving the removable diskette and for selecting and decompressing at least one selected data file recorded on this diskette; and audio output and conditioning means, connected to the playback means, for selecting and retrieving a selected data file and for reproducing the selected data file in audibly perceptible form for playback at a real time delivery rate.

2. The apparatus of claim 1, further comprising:

a keypad, having at least two keys thereon that are tactilely distinguishable or visually distinguishable, connected to said interface and to the playback means, that allows a command to be entered that selects said selected data file and that causes said audio output and conditioning means to convert said selected data file to audible speech.

3. The apparatus of claim 1, wherein said universal data interface comprises a data input/output buffer, adapted for connection to at least one data communications link drawn from the class of communications links consisting of a conventional telephone line, an ISDN telephone line, a digital satellite broadcast link, a two-way interactive television cable link, and an on-line link to a computer.

4. The apparatus of claim 1, further comprising a telephone modem, connected to said data interface, for receiving and converting said incoming signals and for passing the converted incoming signals to said data interface.

5. The apparatus of claim 1, wherein said diskette recording means comprises a PCMCIA format card that accepts and records said data file on said diskette.

6. The apparatus of claim 5, wherein said diskette recording means comprises a removable hard drive system that accepts and records said data file on said removable diskette.

7. The apparatus of claim 5, wherein said data interface comprises a radio frequency receiver and demodulator, arranged for receipt of said selected data file.

8. The apparatus of claim 1, wherein said incoming signal is received as digitized text, and at least one of said microprocessor and said playback means includes a text-to-speech converter for converting digital text to an audio data file.

9. The apparatus of claim 1, wherein said playback means includes an audibly perceptible or visually perceptible display that displays user information, drawn from the groups of user information consisting of (1) an estimated length of time required for real time playback of a user-specified selection recorded on said removable diskette, (2) a title or phrase describing a user-specified selection recorded on said removable diskette and (3) a user-specified category to which a user-specified selection recorded on said removable diskette is assigned.

10. Audio information storage and playback apparatus comprising:

a universal data interface to receive a text data file as part of an incoming signal, in digitized and compressed format, and to provide automatic text data format recognition information for this text data file;

a microprocessor, programmed to receive and use the text data format recognition information to implement a correct communications protocol to receive and extract the text data file from the incoming signal, where the text data file is received by the microprocessor at a transfer rate that is at least two times the transfer rate for normal, audibly perceptible playback of information contained in the text data file;

diskette recording means, connected to the microprocessor, for receiving a removable diskette, for receiving the text data file extracted by the microprocessor, and for recording this text data file in a compressed format on the removable diskette;

text-to-speech conversion means for receiving the removable diskette upon which at least one text data file is recorded and for converting a text data file to an output signal that is in audio format;

playback means for receiving the text-to-speech conversion means output signal and for selecting and decompressing at least one selected data file recorded on this diskette; and audio output and conditioning means, connected to the playback means, for selecting and retrieving a selected text data file and for reproducing the selected text data file in audibly perceptible form for playback at a real time delivery rate.

11. The apparatus of claim 10, further comprising:

a keypad, having at least two keys thereon that are tactilely distinguishable or visually distinguishable, connected to said interface and to the playback means, that allows a command to be entered that selects said selected text data file and that causes said audio output and conditioning means to convert said selected text data file to audible speech.

12. The apparatus of claim 10, wherein said universal data interface comprises a data input/output buffer, adapted for connection to at least one data communications link drawn from the class of communications links consisting of a conventional telephone line, an ISDN telephone line, a digital satellite broadcast link, a two-way interactive television cable link, and an on-line link to a computer.

13. The apparatus of claim 10, further comprising a telephone modem, connected to said data interface, for receiving and converting said incoming signals and for passing the converted incoming signals to said data interface.

14. The apparatus of claim 10, wherein said diskette recording means comprises a PCMCIA format card that accepts and records said text data file on said diskette.

15. The apparatus of claim 14, wherein said diskette recording means comprises a removable hard drive system that accepts and records said text data file on said removable diskette.

16. The apparatus of claim 14, wherein said data interface comprises a radio frequency receiver and demodulator, arranged for receipt of said selected text data file.

17. The apparatus of claim 10, wherein said playback means includes an audibly perceptible or visually perceptible display that displays user information, drawn from the groups of user information consisting of (1) an estimated length of time required for real time playback of a user-specified selection recorded on said removable diskette, (2) a title or phrase describing a user-specified selection recorded on said removable diskette and (3) a user-specified category to which a user-specified selection recorded on said removable diskette is assigned.

18. Audio information storage and playback apparatus comprising:

a universal data interface to receive an audio data file as part of an incoming signal, in digitized and compressed format, and to provide automatic data format recognition information for the audio data file;

a microprocessor, programmed to receive and use the audio data format recognition information to implement a correct communications protocol to receive and extract the compressed audio data file from the incoming signal, where the audio data file is received by the microprocessor at a transfer rate that is at least two times the transfer rate for normal, audibly perceptible playback of information contained in the audio data file;

diskette recording means, connected to the microprocessor, for receiving a removable diskette, for receiving the audio data file extracted by the microprocessor, and for recording this audio data file in a compressed format on the removable diskette;

playback means for receiving the removable diskette and for selecting and decompressing at least one selected audio data file recorded on this diskette; and audio output and conditioning means, connected to the playback means, for selecting and retrieving a selected audio data file and for reproducing the selected audio data file in audibly perceptible form for playback at a real time delivery rate.

19. The apparatus of claim 18, further comprising:

a keypad, having at least two keys thereon that are tactilely distinguishable or visually distinguishable, connected to said interface and to the playback means, that allows a command to be entered that selects said selected audio data file and that causes said audio output and conditioning means to convert said selected audio data file to audible speech.

20. The apparatus of claim 18, wherein said universal data interface comprises a data input/output buffer, adapted for connection to at least one data communications link drawn from the class of communications links consisting of a conventional telephone line, an ISDN telephone line, a digital satellite broadcast link, a two-way interactive television cable link, and an on-line link to a computer.

21. The apparatus of claim 18, further comprising a telephone modem, connected to said data interface, for receiving and converting said incoming signals and for passing the converted incoming signals to said data interface.

22. The apparatus of claim 18, wherein said diskette recording means comprises a PCMCIA format card that accepts and records said audio data file on said diskette.

23. The apparatus of claim 22, wherein said diskette recording means comprises a removable hard drive system that accepts and records said audio data file on said removable diskette.

24. The apparatus of claim 22, wherein said data interface comprises a radio frequency receiver and demodulator, arranged for receipt of said selected audio data file.

25. The apparatus of claim 18, wherein said audio data file in said digitized and compressed format is compressed using a compression algorithm drawn from the class of audio compression algorithms consisting of perceptual encoding, Dolby Labs AC-3 and CCITT recommendation G.722.

26. The apparatus of claim 18, wherein said playback means includes an audibly perceptible or visually perceptible display that displays user information, drawn from the groups of user information consisting of (1) an estimated length of time required for real time playback of a user-specified selection recorded on said removable diskette, (2) a title or phrase describing a user-specified selection recorded on said removable diskette and (3) a user-specified category to which a user-specified selection recorded on said removable diskette is assigned.

27. Audio information storage and playback apparatus comprising:

a universal data interface to receive a text data file as part of an incoming signal, in digitized and compressed format, and to provide automatic data format recognition information for this text data file;

a microprocessor, programmed to receive and use the text data format recognition information to implement a correct communications protocol to receive and extract the text data file from the incoming signal, where the text data file is received by the microprocessor at a transfer rate that is at least two times the transfer rate for normal, audibly perceptible playback of information contained in the text data file;

text-to-speech conversion means, connected to the microprocessor, for receiving a text data file and for converting the text data file to an output signal that is in digitized audio format;

audio compression means for receiving the text-to-speech conversion means output signal and for producing an audio data output signal in a compressed audio format;

diskette recording means, connected to the audio compression means, for receiving a removable diskette, for receiving the audio data output signal, and for recording this audio data output signal in its compressed format on the removable diskette;

playback means for receiving the removable diskette and for selecting and decompressing at least one selected audio data file recorded on this diskette; and p1 audio output and conditioning means, connected to the playback means, for selecting and retrieving a selected audio data file and for reproducing the selected audio data file in audibly perceptible form for playback at a real time delivery rate.

28. The apparatus of claim 27, further comprising:

a keypad, having at least two keys thereon that are tactilely distinguishable or visually distinguishable, connected to said interface and to the playback means, that allows a command to be entered that selects said selected text data file and that causes said audio output and conditioning means to convert said selected text data file to audible speech.

29. The apparatus of claim 27, wherein said universal data interface comprises a data input/output buffer, adapted for connection to at least one data communications link drawn from the class of communications links consisting of a conventional telephone line, an ISDN telephone line, a digital satellite broadcast link, a two-way interactive television cable link, and an on-line link to a computer.

30. The apparatus of claim 27, further comprising a telephone modem, connected to said data interface, for receiving and converting said incoming signals and for passing the converted incoming signals to said data interface.

31. The apparatus of claim 27, wherein said diskette recording means comprises a PCMCIA format card that accepts and records said text data file on said diskette.

32. The apparatus of claim 31, wherein said diskette recording means comprises a removable hard drive system that accepts and records said text data file on said removable diskette.

33. The apparatus of claim 31, wherein said data interface comprises a radio frequency receiver and demodulator, arranged for receipt of said selected text data file.

34. The apparatus of claim 27, wherein said playback means includes an audibly perceptible or visually perceptible display that displays user information, drawn from the groups of user information consisting of (1) an estimated length of time required for real time playback of a user-specified selection recorded on said removable diskette, (2) a title or phrase describing a user-specified selection recorded on said removable diskette and (3) a user-specified category to which a user-specified selection recorded on said removable diskette is assigned.

35. Audio information storage and playback apparatus comprising:

a universal data interface to receive a data file as part of an incoming signal, in digitized and compressed format, and to provide automatic data format recognition information for the data file;

a microprocessor, programmed to receive and use the data format recognition information to implement a correct communications protocol to receive and extract the data file from the incoming signal, where the data file is received by the microprocessor at a transfer rate that is at least two times the transfer rate for audibly perceptible playback of information contained in the data file;

data file interrogation means, connected to the microprocessor, for receiving the data file, for examining the data file to determine whether the data file contains at least one E-mail message and, when the data file contains at least one E-mail message, for removing and discarding the E-mail routing information for each E-mail message that is part of the data file, and for retaining the remainder of each E-mail message in the data file;

diskette recording means, connected to the data file interrogation means, for receiving a removable diskette, for receiving the data file extracted by the microprocessor and processed by the data file interrogation means, and for recording this data file in a compressed format on the removable diskette;

playback means for receiving the removable diskette and for selecting and decompressing at least one selected data file recorded on this diskette; and audio output and conditioning means, connected to the playback means, for selecting and retrieving a selected data file and for reproducing the selected data file in audibly perceptible form for playback at a real time delivery rate.

36. The apparatus of claim 35, further comprising:

a keypad, having at least two keys thereon that are tactilely distinguishable or visually distinguishable, connected to said interface and to the playback means, that allows a command to be entered that selects said selected data file and that causes said audio output and conditioning means to convert said selected data file to audible speech.

37. The apparatus of claim 35, wherein said universal data interface comprises a data input/output buffer, adapted for connection to at least one data communications link drawn from the class of communications links consisting of a conventional telephone line, an ISDN telephone line, a digital satellite broadcast link, a two-way interactive television cable link, and an online link to a computer.

38. The apparatus of claim 35, further comprising a telephone modem, connected to said data interface, for receiving and converting said incoming signals and for passing the converted incoming signals to said data interface.

39. The apparatus of claim 35, wherein said diskette recording means comprises a PCMCIA format card that accepts and records said data file on said diskette.

40. The apparatus of claim 39, wherein said diskette recording means comprises a removable hard drive system that accepts and records said data file on said removable diskette.

41. The apparatus of claim 39, wherein said data interface comprises a radio frequency receiver and demodulator, arranged for receipt of said selected data file.

42. The apparatus of claim 35, wherein said incoming signal is received as digitized text, and at least one of said microprocessor and said playback means includes a text-to-speech converter for converting digital text to an audio data file.

43. The apparatus of claim 35, wherein said playback means includes an audibly perceptible or visually perceptible display that displays user information, drawn from the groups of user information consisting of (1) an estimated length of time required for real time playback of a user-specified selection recorded on said removable diskette, (2) a title or phrase describing a user-specified selection recorded on said removable diskette and (3) a user-specified category to which a user-specified selection recorded on said removable diskette is assigned.

44. Audio information storage and playback apparatus comprising:

a universal data interface to receive a data file as part of an incoming signal, in digitized and compressed format, and to provide automatic data format recognition information for the data file;

a microprocessor, programmed to receive and use the data format recognition information to implement a correct communications protocol to receive and extract the data file from the incoming signal, where the data file is received by the microprocessor at a transfer rate that is at least two times the transfer rate for audibly perceptible playback of information contained in the data file;

diskette recording means, connected to the microprocessor, for receiving a removable diskette, for receiving the data file extracted by the microprocessor, and for recording this data file in a compressed format on the removable diskette;

data file interrogation means, for receiving the data file from the removable diskette, for examining the data file to determine whether the data file contains at least one E-mail message and, when the data file contains at least one E-mail message, for removing and discarding the E-mail routing information for each E-mail message that is part of the data file, and for retaining the remainder of each E-mail message in the data file;

playback means, connected to the data file interrogation means, for receiving all portions of the data file on the removable diskette that are not removed by the data file interrogation means, and for selecting and decompressing at least one selected data file recorded on this diskette; and audio output and conditioning means, connected to the playback means, for selecting and retrieving a selected data file and for reproducing the selected data file in audibly perceptible form for playback at a real time delivery rate.

45. The apparatus of claim 44, further comprising:
a keypad, having at least two keys thereon that are tactilely distinguishable or visually distinguishable, connected to said interface and to the playback means, that allows a command to be entered that selects said selected data file and that causes said audio output and conditioning means to convert said selected data file to audible speech.

46. The apparatus of claim 44, wherein said universal data interface comprises a data input/output buffer, adapted for connection to at least one data communications link drawn from the class of communications links consisting of a conventional telephone line, an ISDN telephone line, a digital satellite broadcast link, a two-way interactive television cable link, and an on-line link to a computer.

47. The apparatus of claim 44, further comprising a telephone modem, connected to said data interface, for receiving and converting said incoming signals and for passing the converted incoming signals to said data interface.

48. The apparatus of claim 44, wherein said diskette recording means comprises a PCMCIA format card that accepts and records said data file on said diskette.

49. The apparatus of claim 48, wherein said diskette recording means comprises a removable hard drive system that accepts and records said data file on said removable diskette.

50. The apparatus of claim 48, wherein said data interface comprises a radio frequency receiver and demodulator, arranged for receipt of said selected data file.

51. The apparatus of claim 44, wherein said incoming signal is received as digitized text, and at least one of said microprocessor and said playback means includes a text-to-speech converter for converting digital text to an audio data file.

52. The apparatus of claim 44, wherein said playback means includes an audibly perceptible or visually perceptible display that displays user information, drawn from the groups of user information consisting of (1) an estimated length of time required for real time playback of a user-specified selection recorded on said removable diskette, (2) a title or phrase describing a user-specified selection recorded on said removable diskette and (3) a user-specified category to which a user-specified selection recorded on said removable diskette is assigned.

* * * * *

(12) EX PARTE REEXAMINATION CERTIFICATE (9526th)
United States Patent
Schulhof et al.

(10) Number: US 5,841,979 C1
(45) Certificate Issued: Feb. 25, 2013

(54) ENHANCED DELIVERY OF AUDIO DATA

(75) Inventors: Nathan Schulhof, Los Gatos, CA (US); James M. Janky, Los Altos, CA (US); Grant Jasmin, Sunnyvale, CA (US)

(73) Assignee: Mobilemedia Ideas LLC, Chevy Chase, MD (US)

Reexamination Request:
No. 90/012,176, Mar. 2, 2012

Reexamination Certificate for:
Patent No.: 5,841,979
Issued: Nov. 24, 1998
Appl. No.: 08/643,963
Filed: May 7, 1996

Related U.S. Application Data

(63) Continuation-in-part of application No. 08/450,818, filed on May 25, 1995, now Pat. No. 5,914,941.

(51) Int. Cl.
*G06F 15/16* (2006.01)
(52) U.S. Cl. ....... 709/237; 700/94; 704/270.1; 704/500; 704/503; 704/E13.008; 709/206; 709/232; 709/247; 711/4; 725/97; 725/99; G9B/20.009
(58) Field of Classification Search ........................ None
See application file for complete search history.

(56) References Cited

To view the complete listing of prior art documents cited during the proceeding for Reexamination Control Number 90/012,176, please refer to the USPTO's public Patent Application Information Retrieval (PAIR) system under the Display References tab.

*Primary Examiner* — Salman Ahmed

(57) ABSTRACT

A system for selection by a user and delivery to the user of selected audio data files at a delivery rate of 2-100 times the delivery rate for normal, audibly perceptible playback of an audio data file. The user registers the user's selection of audio material with a central library of data files and a digitized and compressed omnibus file containing the user's selections is prepared and transmitted to the user at a high data transfer rate. The user receives downloads the omnibus file to a removable, high density diskette or PCMCIA card that may hold ten [Mbytes] Megabytes to one [Gbyte] Gigabyte of digitized text or audio data, using a removable hard drive or its equivalent and a universal data interface that recognized and compensates for omnibus files received in any of a plurality of input signal formats. The user carries this diskette or PCMCIA card until the user has an opportunity to decompress and play back the text or audio data files in audibly perceptible form. The central library contains either text files or audio data files in digitized compressed format. An audio data file may include E-mail messages, from which the system strips the routing information for more convenient playback by the user.

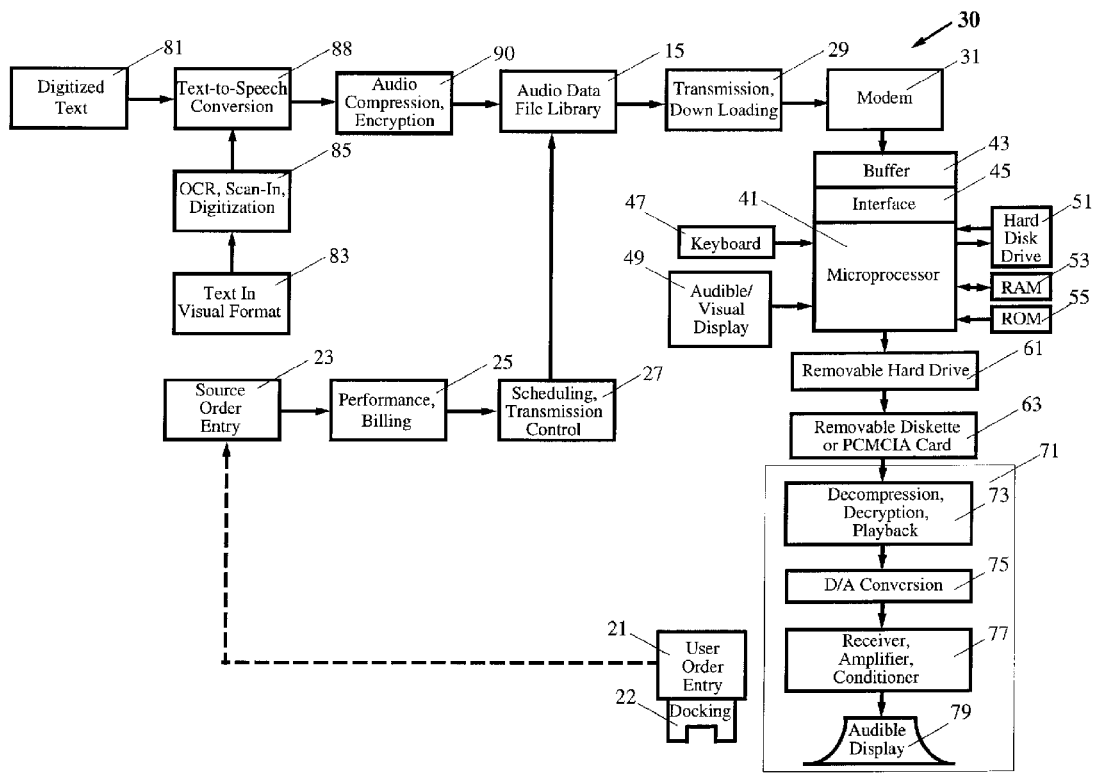

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9, 18-24 and 26 is confirmed.

Claims 10-17, 25 and 27-52 were not reexamined.

* * * * *